Patented Oct. 21, 1924.

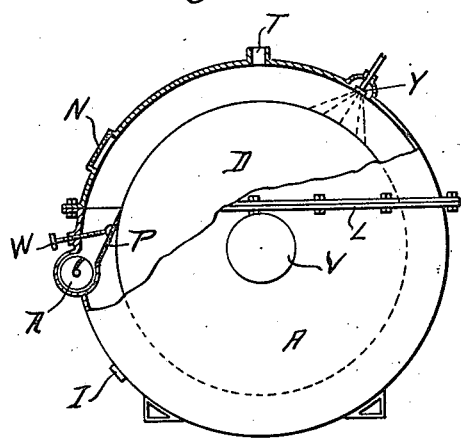
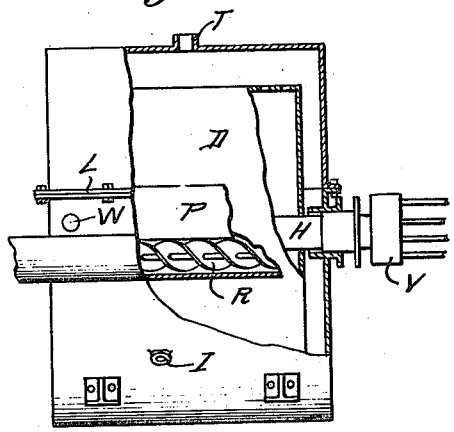
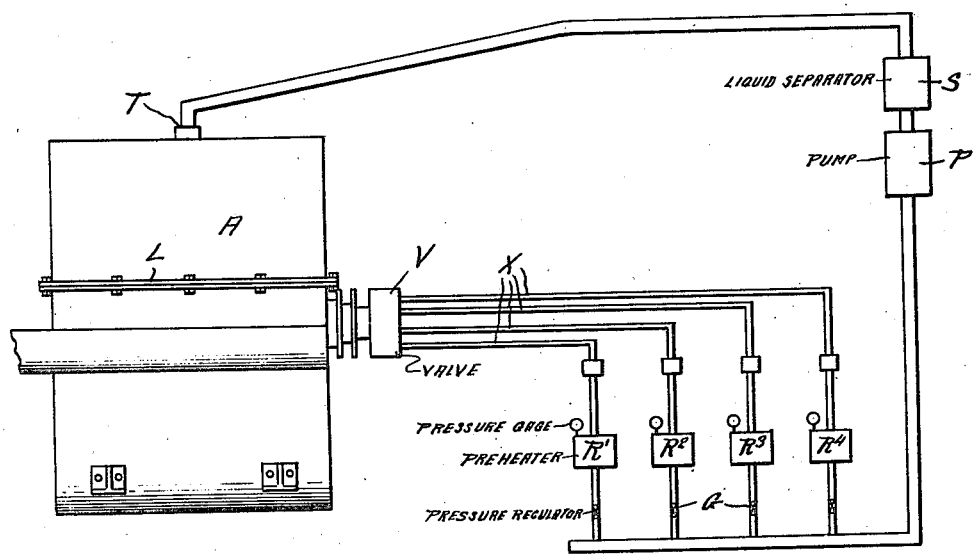

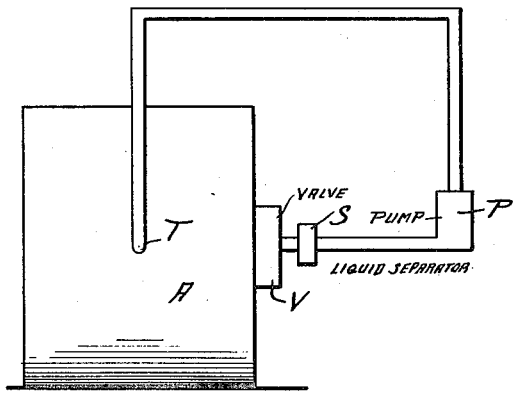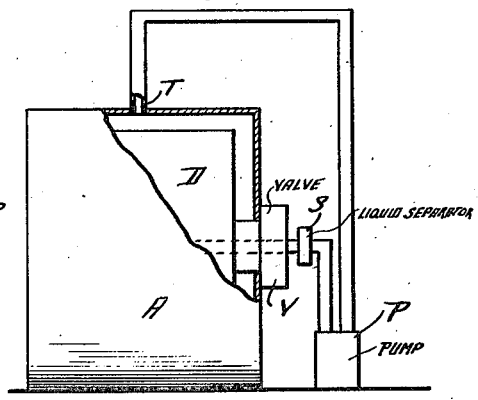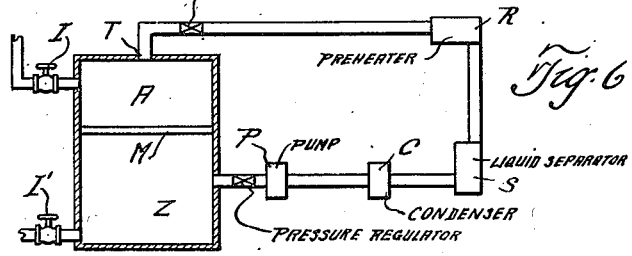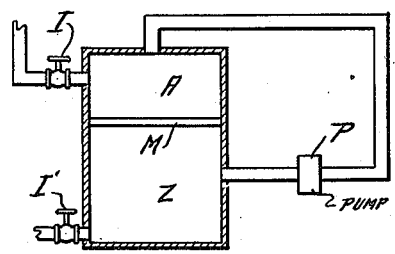

1,512,321

UNITED STATES PATENT OFFICE.

JUSTIN F. WAIT, OF BUFFALO, NEW YORK.

FILTERING PROCESS AND APPARATUS.

Application filed February 2, 1920. Serial No. 355,592.

*To all whom it may concern:*

Be it known that I, JUSTIN F. WAIT, a citizen of the United States, residing at Buffalo, in the county of Erie and State of New York, have invented certain new and useful Improvements in Filtering Processes and Apparatus, of which the following is a specification.

This invention relates to filtration and allied processes, and to apparatus used in the performance thereof, and especially to that type known as pressure filters. The subjects of the present invention are particularly applicable to, or useful in, filters of the rotary type, but may be used in connection with filters of other types, as found desirable.

One object of the invention is to permit the use in the filter of special atmospheres of vapors or gases; another object is to provide for the use of higher pressures than ordinary; another object is to provide for the recovery of a maximum amount of volatile solvents by re-circulating the solvent, thus also preventing undesirable decomposition and crystallization of crystals and impurities in the cake first formed, due to evaporation of the retained solvent. Examples of this are such cases as the filtering for removal of solids from a volatile liquid in which extracted oil or wax has been dissolved by treatment with an organic solvent, or of certain chemicals which might be purified in an organic solvent. These and other objects are accomplished by the methods and apparatus hereinafter described.

Heretofore, filtration has ordinarily been accomplished, in the rotary type of pressure filters, by rotating a gang of filters in an open trough containing the material to be filtered, and these filters pick up the solid material in the form of a cake which is afterwards washed, and then scraped from the filters, the operation being conducted in the air, the filtrate being drained from the precipitate by vacuum drawn through a hollow shaft which carries the filter units.

In the separation of a precipitate from a liquid, it is frequently found that the cake formed during the filtration is altered by contact with air. This is equally true when a substance is being washed or saturated with a liquid. In such cases it is desirable to maintain an atmosphere of inert or protective gas or vapor about the drum or filter element and the material being filtered. An example of this is the case of the reduction of an organic compound containing a nitro group, the corresponding amido compound being easily decomposed or altered by the oxygen of the air. In such a case it is advisable to surround the filter elements with an atmosphere of hydrogen for example. In order to obtain a high economy in the amount of hydrogen used it is essential to recover the hydrogen from the low pressure side of the filter and pump it back to the high pressure side. In extreme cases it may be essential to maintain positive pressures on both sides of the filtering medium in order to prevent infiltration of air from the atmosphere, due to leakage. In such a case, small amounts of hydrogen will be added from time to time, in amounts equivalent to that which is dissipated by leakage, or discharged with the product handled.

Also, in an ordinary vacuum rotary drum filter the rate of filtration is absolutely limited to the capacity of that filter operating under a perfect vacuum, equal to a pressure of approximately fifteen pounds per square inch. In order to greatly increase the rate of filtration of such a filter, as well as to permit the filtration to be effected in a desired atmosphere, I surround the filter by a stationary air tight chamber to which a positive pressure in excess of atmospheric pressure may be applied. By this means the rate of filtration may be greatly increased and the resulting quality improved.

During the process it may be desirable to wash or spray the material on the drum, to which end a number of spray nozzles or the like may be placed within the chamber.

In treating materials by washing or saturating them by means of a volatile solvent it is desirable to eliminate the large losses ordinarily experienced, due to absorbtion of the solvent by the air surrounding the apparatus. For this purpose the washing system, which may use spray nozzles, is entirely inclosed within the chamber referred to, and the air, vapors or gases passing through the filter are pumped back from the low pressure side to the high pressure side, and into the chamber, this pumping being necessary in order to maintain the differential pressures essential to the process of filtration.

By such a closed system it is possible to use solvents and liquids very easily volatilized, and liquids boiling at room temperature and at pressures less than atmospheric may be used for crystallization and washing purposes. The amount of pressure which I impose will be sufficient to raise the boiling point of the liquid above the temperature of the operation.

Hence my process involves or includes the operation of the filter in a closed chamber containing an inert or special atmosphere of vapors or gases, as well as the use of higher pressures, and the re-circulation of such vapors or gases from the low pressure side to the high pressure side of the apparatus.

In order to obtain a filter cake of low liquid content it is frequently advisable to employ an atmosphere of warm air, vapor or gas, and in this case the air or gas applied to the high pressure side is previously heated, or heated at or near the point where it is drawn through the cake. For this purpose I either place heated units inside the casing or heat the gas before it enters the chamber and direct its flow to the desired place.

In re-circulating gases or vapors from the low pressure side of the filter to the high pressure side it is desirable to separate as much of the liquids as possible. This I do by placing a separator or condenser or both in the line between the pump and the chamber. A heat exchanger is desirable under some conditions, to warm the vapors or gases after passing through such condenser or separator, and the heat used may be obtained conveniently from the discharged vapors of the filter or the discharged liquids.

Although reference is made above to filters of the rotary drum type, it is possible to apply the methods involved—that is, inert gases, vapors, higher pressures for the use of volatile components, positive pressures on both sides of the filter medium, circulation and recovery of the same gases or vapors—to other types or classes of filters, such as an ordinary single plate pressure filter. Hence the application of the invention in many of its aspects is not limited to any particular type of filter.

Apparatus suitable for performing the process disclosed is shown in the accompanying drawing. Figs. 1 and 2 are elevations partly in section of a rotary drum filter. Figs. 3, 4, 5, 6 and 7 are diagrams of different types of filters and connections in which the process may be employed.

Referring to Figs. 1 and 2, A indicates a casing or chamber entirely surrounding the filter drum D and adapted to contain the gases or vapors under pressure. The drum may be of any known or suitable construction and will be covered with suitable cloth or other filtering material. P is a scraper for removing the cake from the drum, and W is a screw tapped through the casing and connected to the scraper for adjusting the same. The scraper delivers the cake to a screw conveyer R to remove the same from the casing and discharge it to any desired place; the cake being discharged by the conveyer pipe for example into a receiver under approximately the same pressure as the filter, thereby preventing loss of gas through the conveyor.

The drum will be divided into a plurality of sections as well known in the art, to each of which different suctions or pressures may be applied, by means of a known distributing valve V. The casing is preferably divided into two sections joined at bolted flanges L. T is an inlet for the gases or vapors with which the drum is surrounded; I is the inlet for the material to be filtered which will be supplied under the same pressure as that in the filter; H is a hollow revolving shaft containing outlet pipes from the sections of the drum, connecting with the distributing valve through which pipes and valve the filtered liquid is drawn off in a known manner; and Y is a spray pipe for the washing fluids. These parts may be adapted from known filters and require no extended description, the gas tight outer chamber being however a new feature.

N is a window or sight glass in the casing, since in the construction of such a machine it is highly desirable to be able to determine the depth of liquid within the chamber and to inspect the cake as it is delivered by the drum, and at other times during the cycle.

It will be understood that the drum is revolved, and under vacuum will pick up the precipitate in the form of a cake which will first be washed by the spray and then detached by the scraper, the distributing valve V regulating the pressures at the different points in the cycle. Suitable control of the filter is secured by constructing the valve V so that the pressure on the sections of the filter may be so controlled that different sections will have different pressures during different periods of operation, the pressure on one side being the lower during the different periods of the treatment. It may at times be desirable to reverse the pressure at a certain period to aid in discharging the cake when the treatment is complete, this being a known operation.

It may be stated that if a small pressure in excess of atmospheric pressure or a pressure equal to atmospheric pressure is carried on the low pressure side of the filter it will be possible to use liquids with low boiling points and prevent their evaporation while in the cake, thus preventing undesirable crystallization in the cake. One of the main reasons for adjusting the pressure in the individual sections on the low pressure side of a rotary drum filter is that it is desirable to have less pressure during the washing period and during that part of the drying period in which the cake is apt to crack.

Figs. 3 and 4 illustrate the application of the process to a rotary filter, and show the return circulation from the valve V through a separator S to remove the liquids, the pump P returning the vapors or gases to the casing A through the inlet at T.

Figs. 5 and 6 illustrate ordinary single plate filters, with return of gases or vapors, A being the pressure chamber above the filter medium M, Z the low pressure chamber from which the gases are drawn by a pump P and forced through a condenser C, separator S, receiver and heater R back to the inlet T, I and I¹ being inlet and outlet for material respectively.

Fig. 7 may be conveniently read in connection with a rotary drum filter of the type shown in Figs. 1 and 2 having different pressure sections, with a distributing valve V the different outlets from which are piped as indicated at X to different receivers and heaters R¹, R², R³ and R⁴ and thence to a pump P and separator S, the gases being returned to the filter inlet T. The lines are provided with pressure regulating valves G respectively, to vary the suction pressure on the respective sections.

The invention may be embodied or practiced in machines of various other types, and no limitation in this respect is implied. Also selected features or steps of the process may be employed, without the use of others, and be within the scope of the invention, depending largely on the results desired and the nature of the material being treated.

By pressure filtering, in this specification, is meant processes of filtering in which the flow of liquid through a membrane, cloth or other medium is made positive by the application of pressure on one side of that medium in excess of the pressure existing on the other side.

I claim:—

1. In pressure filtering for the separation of solids from liquids, the method comprising conducting the filtration in a reducing atmosphere with respect to the filter cake.

2. In pressure filtering employing a volatile solvent, for the purpose of treating the filter cake, the method comprising forcing a gaseous fluid and a solvent through the precipitate in the filter and returning said fluid and the solvent absorbed thereby to the filter for re-circulation therethrough.

3. In pressure filtering for the separation of solids from liquids, the method comprising excluding air from the interior of the filter and maintaining therein a non-oxidizing atmosphere with respect to the filter cake.

4. In pressure filtering, the method comprising filtering, washing the filter cake with a volatile solvent, subjecting it to the pressure of a gas, and returning the gas that passes through the filter to the high pressure side of the filter for successive operations.

5. In pressure filtering, the method comprising excluding air from the filter, washing the filter cake in the filter by a solvent, recovering the solvent by separation from dissolved substances and returning the solvent to the filter.

6. In pressure filtering for the separation of solids from liquids, the method comprising surrounding the filtering medium and the filter cake, during filtration, with an atmosphere of hydrogen under pressure, and returning the hydrogen from the low pressure to the high pressure side of the filtering medium.

7. In pressure filtering for the separation of solids from liquids, the method comprising, circulating a gaseous solvent fluid through the filter cake from the high pressure side to the low pressure side and back to the high pressure side, and separating the liquid portion of the fluid from the gaseous portion thereof before its return to the high pressure side.

8. In a pressure filter, the combination of a closed filtering chamber, filtering elements therein having sections for different pressures, a distributing valve communicating with said sections, pipes communicating with said valve and each provided with a pressure regulating valve, a return pipe from said pipes to the high pressure side of the chamber, and a pump in said return pipe.

9. In pressure filtering for the separation of solids from liquids, the method of drying the cake formed, consisting of subjecting it to the pressure of a non-oxidizing gas and also keeping it free from appreciable quantities of air.

In testimony whereof, I hereby affix my signature in presence of two witnesses.

JUSTIN F. WAIT.

Witnesses:
C. A. K. PISTELL,
FRANK C. IMBU, JR.